United States Patent [19]

Brzezinska et al.

[11] Patent Number: 5,808,126
[45] Date of Patent: Sep. 15, 1998

[54] SYNTHESIS OF FUNCTIONAL SILYL TERMINATED BRANCHED POLYALKENYLENES AND POLYOLEFINS

[75] Inventors: Krystyna Regina Brzezinska, Gainesville, Fla.; Gary Thomas Burns; Russell Keith King, both of Midland, Mich.; Kenneth Boone Wagener, Gainvesville, Fla.

[73] Assignees: Dow Corning Corporation, Midland, Mich.; The University of Florida, Gainesville, Fla.

[21] Appl. No.: 927,151

[22] Filed: Sep. 3, 1997

[51] Int. Cl.$^6$ ........................................... C07F 7/08
[52] U.S. Cl. .......................... 556/431; 556/435; 528/14; 528/15; 528/19
[58] Field of Search .................. 556/431, 435; 528/14, 15, 19

[56] References Cited

U.S. PATENT DOCUMENTS

| | | | |
|---|---|---|---|
| 3,429,847 | 2/1969 | Boissieras et al. | 556/431 |
| 3,714,118 | 1/1973 | Chandra et al. | 556/431 |
| 3,920,714 | 11/1975 | Streck . | |
| 3,920,715 | 11/1975 | Streck . | |
| 3,929,850 | 12/1975 | Streck . | |
| 4,395,562 | 7/1983 | Yohji et al. | 556/431 |
| 5,006,584 | 4/1991 | Davis | 556/431 |
| 5,026,891 | 6/1991 | Colas et al. | 556/435 |
| 5,521,255 | 5/1996 | Roy . | |
| 5,527,934 | 6/1996 | Jung et al. | 556/431 |

OTHER PUBLICATIONS

Hillmyer et al, Preparation of Hydroxytelechelic Poly(butadiene) via Ring–Opening Metathesis Polymerization Employing a Well–Defined Metathesis Catalyst, *Macromolecules* 26, 872–874 (1993).

Chung et al, "Synthesis of Telechelic 1,4–Polybutadiene by Metathesis Reactions and Borane Monomers", *Macromolecules*, 25, 5137–5144 (1992).

Marmo et al., "Acyclic Diene Metathesis (ADMET) Polymerization. Synthesis of Mass–Exact Telechelic Polybutadiene Oligomers", *Macromolecules*, 26, 2137 (1993).

Marmo et al., "Acyclic Diene Metathesis (ADMET) Depolymerization. The Synthesis of Mass Exact Telechelic 1,4–Polybutadiene Oligomers", *Polymer Preprints,* 34(1), 471 (1993).

Bauch et al., "Acyclic Diene Metathesis (ADMET) Polymerization. Synthesis of an Unsaturated Polyester", *Polymer Preprints,* 32(1), 377 (1991).

Smith et al., "Acyclic Diene Metathesis (ADMET) Polymerization. Synthesis and Characterization of Unsaturated Poly[carbo(dimethyl)silanes]", *Macromolecules,* 24, 6073 (1991).

Wagener et al., "Acyclic Diene Metathesis (ADMET) Polymerization. The Synthesis of Unsaturated Poly(carboxiloxanes)", *Polymer Preprints,* 33(1), 1078 (1992).

Smith et al., "Acyclic Diene Metathesis (ADMET) Copolymerization. Synthesis of Poly(siloxalkenylene–co–biphenylene)", *Polymer Preprints,* 33(2), 112 (1992).

Smith et al., "Acyclic Diene Metathesis (ADMET) Polymerization. Controlled Diene Insertion in Poly[(hexamethyltrisiloxanediyl)butenylene]", *Macromolecules,* 26, 3533–3537 (1993).

*Primary Examiner*—Paul F. Shaver
*Attorney, Agent, or Firm*—Killworth, Gottman, Hagan & Schaeff, LLP

[57] ABSTRACT

A method for preparing an α,ω-silyl terminated branched polyalkenylenes and polyolefins is provided. The method involves:

(I) reacting a mixture comprising
  (A) at least one branched acyclic diene, and
  (B) at least one alkenylsilane in the presence of an acid free metathesis catalyst system to produce an α,ω-silyl terminated branched polyalkenylene; or (I) reacting a mixture of
  (A) at least one cycloolefin, and
  (B) at least one alkenylsilane in the presence of an acid free metathesis catalyst system to produce an α,ω-silyl terminated branched polyalkenylene. The α,ω-silyl terminated branched polyalkenylene produced by these methods may be hydrogenated to produce an α,ω-silyl terminated branched polyolefin.

18 Claims, 11 Drawing Sheets

SYNTHESIS OF FUNCTIONAL SILYL TERMINATED BRANCHED POLYALKENYLENES AND POLYOLEFINS

BACKGROUND OF THE INVENTION

The present invention relates to telechelic silyl terminated branched polyalkenylenes and polyolefins and methods for producing them. More particularly, it relates to ADMET and ROMP polymerization processes for producing α,107 -silyl terminated polyalkenylenes and polyolefins and the products produced thereby.

Telechelic polymers with functional groups at both chain ends are a very interesting and useful class of materials. They have several potential uses, including both theoretical (e.g. model network) and commercial (e.g. liquid rubber) applications. In the past, this type of polymer was mostly prepared by terminating living polymers with suitable reagents in conjugation with the use of difunctional initiators or functionally substituted initiators. The anionic, cationic, and recently, metathesis living polymerization are particularly preferred because these routes provide well-defined polymers with a high degree of functional groups at both ends of the polymer chain. However, these processes are limited because only a few monomers undergo living propagation.

Telechelic polymers have been produced by other methods. In U.S. Pat. Nos. 3,920,715 and 3,929,850, Streck describes the synthesis of silyl terminated polyoctenes via: (1) ROMP polymerization of cycloolefins with alkenyl silanes and (2) Metathesis of polyenes with alkenylsilanes. In a related patent, U.S. Pat. No. 3,920,714, Streck describes the metathesis of silylfunctional cycloolefins to make polyoctenes with pendant silyl groups. In this series of patents, Streck also describes methods for crosslinking the silyl functional polyenes and their use in blends with other organic polymers.

The synthesis of telechelic polybutadiene has also been described by Grubbs (*Macromolecules*, 1993, 26, 872–874) and Chung (*Macromolecules*, 1992, 25, 5137–5144) by using 1,4-difunctional-2-butenes to endcap the ROMP polymerization of cyclooctadiene. Low molecular weight, silyl terminated polybutadiene oligomers have also been reported by Wagener (*Macromolecules*, 1993, 26, 2137: *Polymer Preprints*, 34, 471 (1993);) by the ADMET catalyzed depolymerization of polybutadiene in the presence of allylsilanes.

In addition, the synthesis of silyl terminated polydienes and their hydrogenated products are disclosed in U.S. Pat. No. 5,521,255 (Roy). The silyl terminated polydienes are made in a two step process. In the first step, a conjugated diene is anionically polymerized with a difunctional initiator which is then quenched with an excess of a chlorosilane or hexamethylcyclotrisiloxane. However, anionic polymerization of a diene is not regiospecific (i.e. both 1,4 and 1,2 addition occur).

In a series of publications, Wagener has copolymerized a variety of alkenylsilanes with non-conjugated α,ω-dienes to make carbosilane and carbosiloxane copolymers (*Polymer Preprints*, 32, 377 (1991): *Macromolecules*, 24, 6073 (1991); *Polymer Preprints*, 33, 1078 (1992); *Polymer Preprints*, 33, 112 (1992); *Macromolecules*, 26, 3533 (1993)). In this work the alkenylsilanes were difunctional and acted as comononers (i.e. they were incorporated into the backbone), and did not act as chain limiters or endblockers.

As can be seen from the discussion above, none of these references disclose a method of making branched silyl terminated polyalkenylenes and polyolefins. Therefore, a need still exists for a method of producing functional silyl terminated branched polyalkenylenes and polyolefins.

SUMMARY OF THE INVENTION

This need is met by the present invention, wherein two processes are provided which produce α,ω-silyl terminated polyalkenylenes and polyolefins. The processes are acyclic diene metathesis (ADMET) polymerization and ring opening metathesis polymerization (ROMP). The α,ω-silyl terminated branched polyalkenylenes and polyolefins of the present invention have several uses. These uses include intermediates for making (AB)n PDMS-polyolefin copolymers, surface modification of polyolefin copolymers, and intermediates for making liquid organic rubbers.

In one embodiment of the present invention, a method for preparing an α,ω-silyl terminated polyalkenylene is provided. The method comprises reacting a mixture comprising:

(A) at least one branched acyclic diene, and
(B) at least one alkenylsilane in the presence of an acid free metathesis catalyst system to produce an α,ω-silyl terminated branched polyalkenylene.

In a preferred embodiment, the α,ω-silyl terminated branched polyalkenylene is hydrogenated to produce an α,ω-silyl terminated branched polyolefin.

Preferably, the acid free metathesis catalyst system is selected from the group consisting of $Mo(CH-CMe_2Ph)$ $(N-2,6-C_6H_3-i-PR_2)$ $(OCMe(CF_3)_2)_2$, $W(CH-CMe_2Ph)$ $(N-2,6-C_6H_3-i-Pr_2)$ $(OCMe(CF_3)_2)_2$, $RuCl_2(=CHCH=CPh_2)$ $(PCy_3)_2$, $WCl_6/SnMe_4/PrOAc$, and $RuCl_2(=CHPh)$ $(PCy_3)_2$, where Cy is cyclohexyl $(C_6H_{11}$. More preferably, the acid free metathesis catalyst system is $Mo(CH-CMe_2Ph)$ $(N-2,6-C_6H_3-i-PR_2)$ $(OCMe(CF_3)_2)_2$.

Preferably, the branched acyclic diene is a non-conjugated α,ω-diene. The preferred monomers are α,ω-dienes of the general formula:

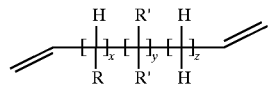

where x, y and z can be 0 to 20 with the provision that $x+y+z=\geq 2$ Cyclic monomers which can be used in this invention have the general formulas:

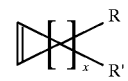

where x=1, 2, 3 or >4 and R and R' are independently selected from H, alkyl $(C_1-C_6)$ or aryl.

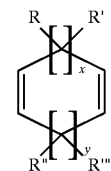

where x and $y \geq 1$ and x+y>2 and R, R', R'', R''' are independently selected from H, alkyl $(C_1-C_6)$ or aryl. Preferably the branched acyclic diene is selected from the group consisting of 3-methyl-1,5-hexadiene and 5-methyl-1,9-decadiene.

The alkenylsilane is preferably selected from the group consisting of hexenylchlorosilanes, hexenylalkoxysilanes and their self-metathesis dimers. More preferably, the alkenylsilane is selected from the group consisting of 5-hexenylchlorodimethylsilane, 5-hexenylmethoxydimethylsilane, and their self-metathesis dimers.

In a second embodiment of the present invention, a method for preparing an α,ω-silyl terminated polyalkenylene is provided. The method comprises reacting a mixture comprising:

(A) at least one cycloolefin, and
(B) at least one alkenylsilane in the presence of an acid free metathesis catalyst system to produce an α,ω-silyl terminated branched polyalkenylene.

In a preferred embodiment, the α,ω-silyl terminated branched polyalkenylene is hydrogenated to produce an α,ω-silyl terminated branched polyolefin.

Preferably, the acid free metathesis catalyst system is selected from the group consisting of $Mo(CH-CMe_2Ph)$ $(N-2,6-C_6H_3-i-Pr_2)$ $(OCMe(CF_3)_2)_2$, $W(CH-CMe_2Ph)$ $(N-2,6-C_6H_3-i-Pr_2)$ $(OCMe(CF_3)_2)_2$, $RuCl_2$ $(=CHCH=CPh_2)$ $(PCy_3)_2$, $WCl_6/SnMe_4/PrOAc$, and $RuCl_2(=CHPh)$ $(PCy_3)_2$, where Cy is cyclohexyl $(C_6H_{11})$. More preferably, the acid free metathesis catalyst system is $Mo(CH-CMe_2Ph)$ $(N-2,6-C_6H_3-i-Pr_2)$ $(OCMe(CF_3)_2)_2$.

Preferably, the cycloolefin is selected from the group consisting of norbornene, alkyl substituted cyclopentene, alkyl substituted cyclooctene and alkyl substituted 1,4-cyclooctadiene.

The alkenylsilane is preferably selected from the group consisting of hexenylchlorosilanes, hexenylalkoxysilanes and their self-metathesis dimers. More preferably, the alkenylsilane is selected from the group consisting of 5-hexenylchlorodimethylsilane, 5-hexenylmethoxydimethylsilane and their self-metathesis dimers.

It is also possible to use both an acylic diene and a cycloolefin, i.e. a cometathesis of for example 1,9-decadiene and norbornene (see example 6).

In a third embodiment of the present invention, an α,ω-silyl terminated polyalkenylene is provided. The α,ω-silyl terminated polyalkenylene has the general formula:

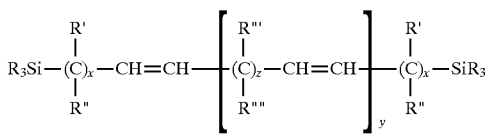

where R, R', R", R"', R"" are independently selected from the group $(C_1-C_6)$, H, aryl, organofunctional alkyl group, chloro, bromo, alkoxy and cycloalkane; x is 1–10, y is 10–10,000 and z=3–20.

In a fourth embodiment of the present invention, an α,ω-silyl terminated polyolefin is provided. The α,ω-silyl terminated polyolefin has the general formula:

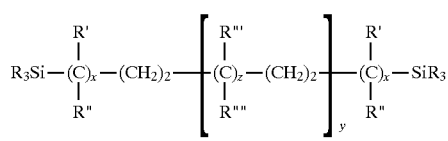

where R, R', R", R"', and R"" are independently selected from the group $(C_1-C_6)$, H, aryl, organo functional cycloalkane; x is 1–10, y is 10–10,000 and z=3–20.

Accordingly, it is a feature of the present invention to provide an efficient method of producing functional silyl terminated branched polyalkenylenes and polyolefins.

DETAILED DESCRIPTION OF THE PREFERRED EMBODIMENTS

Figure 1:
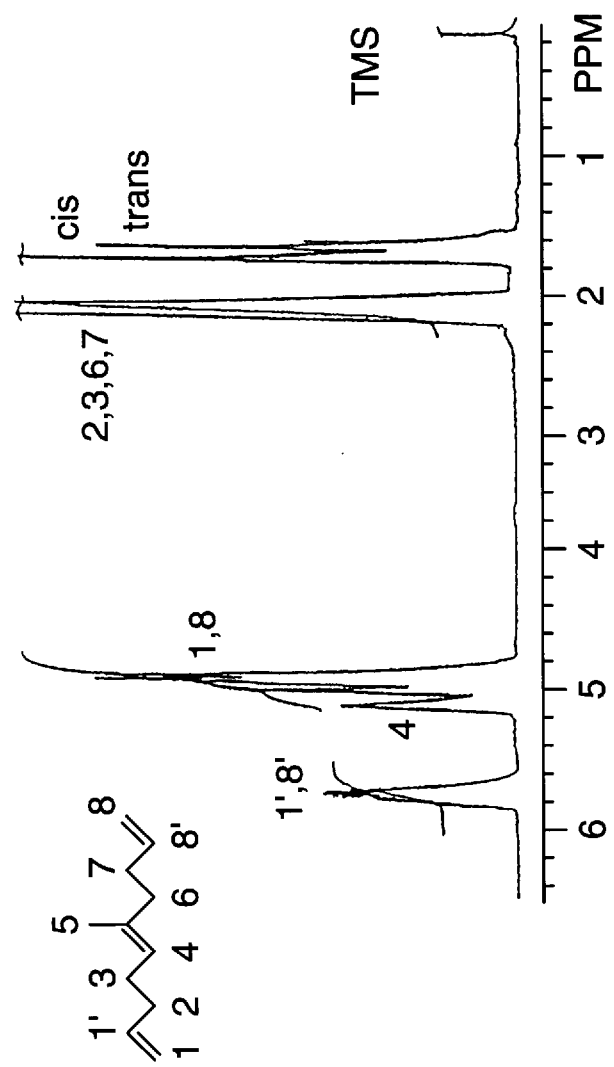
FIG. 1 is a representation of a $^1$H NMR (300 MHz) spectra of the product of Example 2.

The present invention produces functional silyl terminated branched polyalkenylenes and polyolefins using two different techniques: acyclic diene metathesis (ADMET) polymerization and ring opening metathesis polymerization (ROMP).

Acyclic diene metathesis (ADMET) polymerization is a viable route towards the synthesis of linear unsaturated polymers. ADMET has produced a variety of unsaturated polymers where the functionalities have been ethers, esters, carbonates, ketones, siloxanes, silanes and sulfides. ADMET is a step polymerization, condensation type reaction wherein an equilibrium is established between monomer and products (polymer and a small molecule). The equilibrium can be shifted toward polymer if the small condensed molecule is removed. A typical ADMET polymerization reaction is presented below:

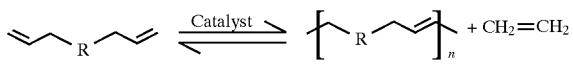

The present invention uses ADMET step-growth polymerization to synthesize α,ω-difunctional polymers through co-metathesis of a branched acyclic diene with a functional 1-alkene. The functional alkene also serves as a molecular weight control agent. "Acyclic dienes" are defined as dienes, the polymerization of which according to the described ADMET method do not involve ring-opening to produce the polymeric product, i.e., the diene portion of the molecule undergoing polymerization is acyclic. Although the term includes dienes which may contain cyclic substituents, the latter are non-functional in the sense that they do not participate in and remain unaffected by the polymerization reaction. A typical ADMET polymerization reaction using a chain limiter is presented below:

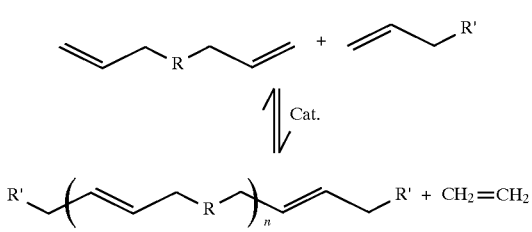

A specific example of this type of reaction is the combination of 5-methyl-1,5,9-decatriene with 5-hexenylchlorodimethylsilane in the presence of a catalyst:

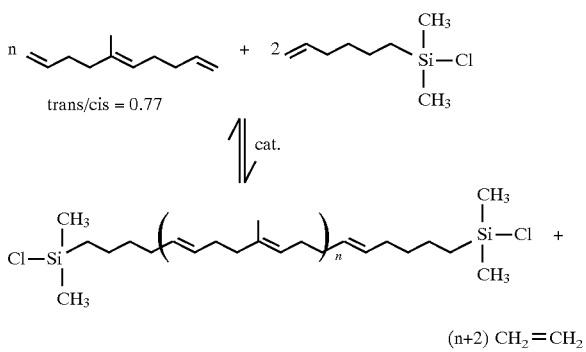

The resulting 5-hexenylchlorodimethylsilane terminated polyalkenylenes may be hydrogenated to produce 5-hexenylchlorodimethylsilane terminated polyolefins. The preferred hydrogenation processes are chemical reduction with p-Toluenesulfonohydrazide (TSH), or a catalytic hydrogenation using Pd/C as the catalyst, at −30° to 200° C., and most preferably at room temperature to 150° C., for 10 minutes to 2 hours at a pressure of from 1 to 200 atmospheres.

Other hydrogenation reactions which can be used include such catalytic processes ($H_2$+Pd/C; $H_2$+$(Ph_3)_3$PRhCl; $H_2$+Pt/C, and $H_2$+Co/Ni carboxylates).

The preferred reaction condition for the above-described ADMET polymerization are +20° to 250° C., and most preferably 25° to 100° C., for between 10 minutes to 70 hours, at a pressure of $10^{-4}$ mmHg to one atmosphere.

As stated above, the functional 1-alkene functions as a molecular weight control agent (also referred to as a chain limiter). Preferably, the mole ratio of monomer to chain limiter ranges from about 25:1 to 1000:1. Alkenylsilanes are the preferred functional 1-alkenes. More preferably, the alkenylsilanes are selected from the group consisting of hexenylchlorosilanes, hexenylalkoxysilanes, and their self-metathesis dimers. Most preferably, the alkenylsilanes are selected from the group consisting of 5-hexenylchlorodimethylsilane, 5-hexenylmethoxydimethylsilane, and their self-metathesis dimers.

The amount of alkenylsilane used is inversely proportional to the number average molecular weight. The ($M_n$) of the polymer increases as the ratio of the monomer to the alkenylsilane increases (see Example 1). This demonstrates the usefulness of an alkenylsilane as a chain limiter in the process of the present invention, resulting in a polymer chain with a degree of polymerization of preferably 20–2000.

The process of the present invention uses an acid free metathesis catalyst system. Preferably, the acid free metathesis catalyst system is selected from the group consisting of Mo(CH—$CMe_2$Ph) (N-2,6—$C_6H_3$—i—$Pr_2$) (OCMe($CF_3$)$_2$)$_2$, W(CH—$CMe_2$Ph) (N-2,6—$C_6H_3$—i—$Pr_2$) (OCMe($CF_3$)$_2$)$_2$, $RuCl_2$(=CHCH=$CPh_2$) ($PCy_3$)$_2$, $WCl_6$/$SnMe_4$/PrOAc, and $RuCl_2$(=CHPh) ($PCy_3$)$_2$. More preferably, the acid free metathesis catalyst system is Mo(CH—$CMe_2$Ph) (N-2,6—$C_6H_3$—i—$Pr_2$) (OCMe($CF_3$)$_2$)$_2$. Also, the mole ratio of monomer to catalyst preferably ranges from about 200:1 to about 1000:1, and most preferably between 500:1 and 700:1.

It is noted that Lewis acid catalysts, such as the one used in U.S. Pat. No. 3,920,714 (Streck), are less effective than the catalyst of the present invention. As Comparative Example 1 demonstrates, Streck's catalyst results in vinyl addition reactions in addition to the polymerization reaction. This results in a product which is less pure than the product of the present invention (see Example 7).

Ring opening metathesis polymerization (ROMP) may also be used to produce the functional silyl terminated branched polyalkenylenes and polyolefins of the present invention. ROMP polymerization uses strained cycloolefins to produce polymers. A typical ROMP reaction is presented below:

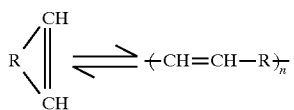

The term cycloolefin means an unsaturated hydrocarbon of one or more rings, at least one of which rings contain at least one unsubstituted non-conjugated double bond.

The present invention uses ROMP polymerization to synthesize α,ω-difunctional polymers through co-metathesis of a cycloolefin with a functional 1-alkene. Again, the functional alkene also serves as a molecular weight control agent, resulting in a polymer chain with a degree of polymerization preferably between 20–2000.

A specific example of this type of reaction is the combination of norbornene with 5-hexenylmethoxydimethylsilane in the presence of a catalyst. The reaction conditions for the ROMP polymerization are the same as those described above for the ADMET polymerization.

The resulting 5-hexenylchorodimethylsilane terminated polyalkenylenes may be hydrogenated to produce 5-hexenylchlorodimethylsilane terminated polyolefins using the same processes discussed above.

In order that the invention may be more readily understood, reference is made to the following examples, which are intended to be illustrative of the invention, but are not intended to limit the scope of the present invention.

EXAMPLE 1

Figure 3:
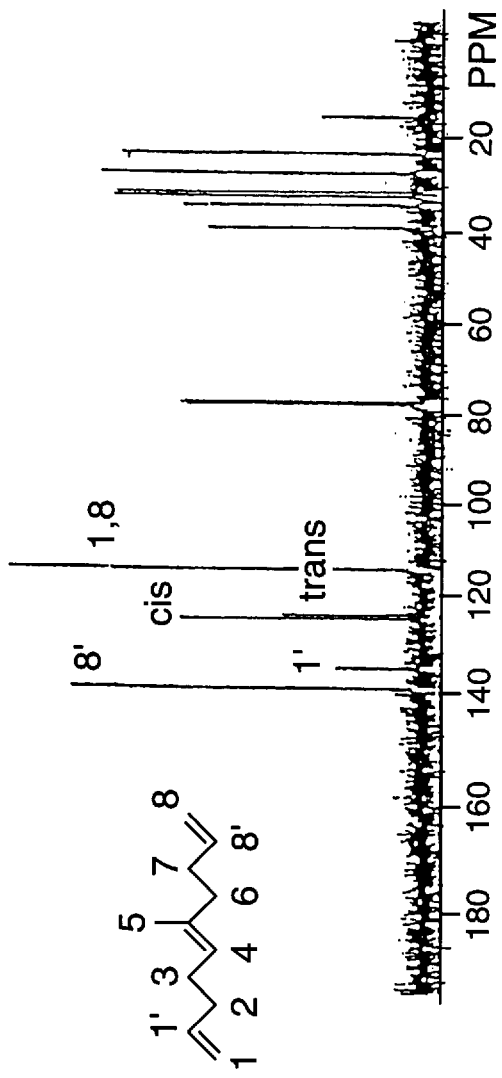
FIG. 3 is a representation of a $^{13}$C NMR (75 MHz) spectra of the product of Example 2.

5-methyl-1,5,9-decatriene was synthesized from 7.3 mL of 5-hexene-2-one, and an ylide prepared from 26.3 g. of 1-pentenyl-triphenylphosphonium bromide and 32 mL of 2.0 molar solution of n-butyllitium in THF at −78° C. The mixture was allowed to warm to room temperature over six hours, during which all of the salt dissolved and the ylid was apparent by the red color of the solution. This mixture was then cooled to −70° C. and 7.3 mL of 5-hexene-2-one in 20 mL of dry THF was added slowly with stirring. This reaction solution was then warmed to room temperature, followed by refluxing for 12 h. The THF was then distilled out of the reaction flask and 100 mL of pentane added along with 100 mL of water. The pentane was decanted and the water was extracted with another 100 mL of pentane. The combined pentane layers were washed with 50 mL portions of dilute HCl, water, 5% solution of NaHCO$_3$ and water. The pentane layer was dried over MgSO$_4$ and filtered through alumina. The pentane was distilled off. The isolated product was distilled at 78° C. at 15 mm Hg. Then, the monomer was distilled from CaH$_2$ degassed by several freeze-thaw cycles, and vacuum transferred to successive sodium mirrors and stirred until no reaction was observed. The resulting product was 5-methyl-1,5,9-decatriene. FIGS. 1 and 3 show the $^1$H and $^{13}$C NMR spectra of the resulting product.

5-methyl-1,5,9-decatriene was polymerized in several experiments. The first experiment did not use a chain limiter (Example 2). The other experiments used 5-hexenylchlorodimethylsilane as a chain limiter (Example 3).

EXAMPLE 2

5-methyl-1,5,9-decatriene was reacted with Schrock's molybdenum catalyst, Mo(CH—CMe$_2$Ph) (N-2,6—C$_6$H$_3$—i—Pr$_2$) (OCMe(CF$_3$)$_2$)$_2$, to obtain a high molecular weight polymer. 20 mg of Schrock's molybdenum catalyst was reacted with 1 mL of 5-methyl-1,5,9-decatriene. The reaction was allowed to continue until the contents could no longer be stirred by magnetic agitation. At this time, the flask was opened to the atmosphere and the polymer was dissolved in toluene and passed through an alumina column. The properties of the resulting polymer are shown in Table 2.

EXAMPLE 3

Figure 2:
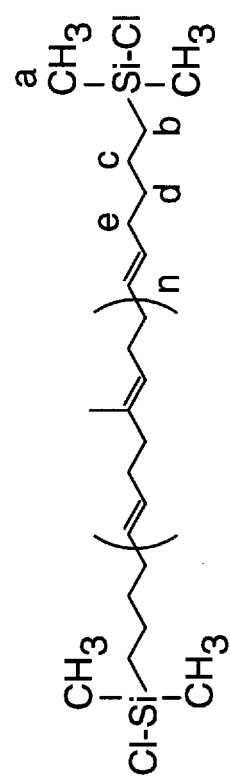
FIG. 2 is a representation of a $^1$H NMR (300 MHz) spectra of the product of Example 4.
Figure 2:
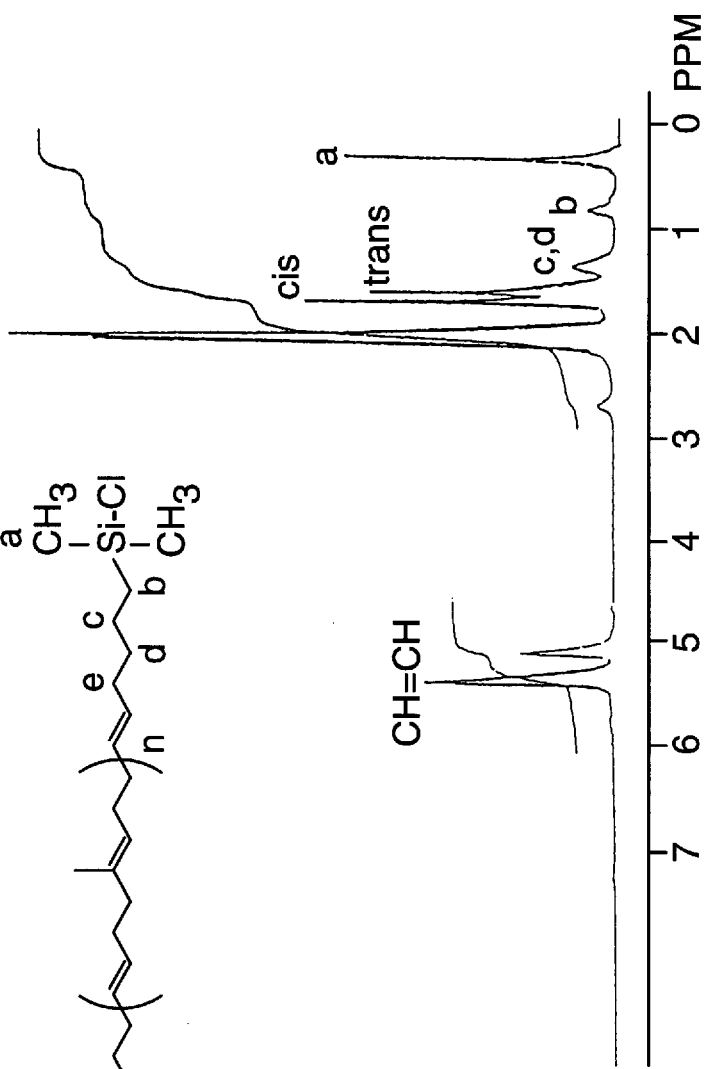
Figure 4:
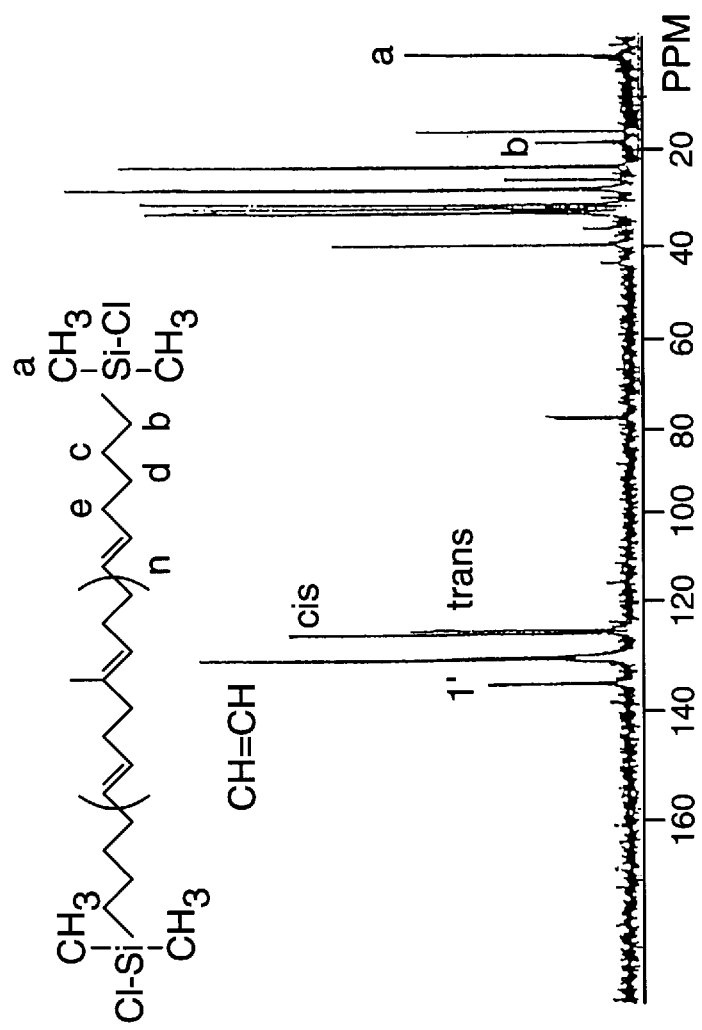
FIG. 4 is a representation of a $^{13}$C NMR (75 MHz) spectra of the product of Example 4.

1 mL of 5-methyl-1,5,9-decatriene, combined with varying amounts of 5-hexenylchlorodimethylsilane (see Table 1), was vacuum transferred to the reaction flask, followed by the addition of 20 mg of Schrock's molybdenum catalyst. Pure ethylene evolved during the polymerization, as confirmed by GC/MS. After 5 min the reaction mixture became more viscous and after 24 h at 60°0 C., the reaction was quenched by exposure to the atmosphere. The polymer was dissolved in dry toluene and 0.1 g of dry alumina was added under vacuum. After a few minutes, any alumina was filtered off using a G3 sintered glass filter (also under vacuum). Toluene then was removed in vacuo, and the polymer was dried in vacuo at room temperature overnight. FIGS. 2 and 4 show the $^1$H and $^{13}$C NMR spectra of the resulting product.

TABLE 1

Molecular weight of 5-hexenylchlorodimethylsilane terminated telechelic poly-5-methyl-1,5,9-decatriene prepared by ADMET polymerization using M$_o$(CH—CMe$_2$Ph) (N-2,6-C$_6$H$_3$-i-Pr$_2$ (OCMe(CF$_3$)2)$_2$ as the catalyst (5-methyl-1,5,9-decatriene: 0.011 mol, 60° C., 24 h.)

| No. | ch. limit. (mol) | M$_n$(th.) | M$_n$[1] | M$_n$[2] | M$_w$/M$_n$ |
|---|---|---|---|---|---|
| 61 | 0.0025 | 1500 | 1450 | 2800 | 2.2 |
| 62 | 0.0015 | 2300 | 1900 | 4700 | 1.75 |
| 60*) | — | — | — | 14400 | 1.9 |

[1] from $^1$H NMR spectrum of the polymer.

[2] from gel permeation chromatography (GPC) of the polymer-calibration for polystryene standards.

*)without chain limiter.

The reaction for the preparation of 5-hexenylchlorodimethylsilane terminated branched telechelic polyoctenamer is presented below:

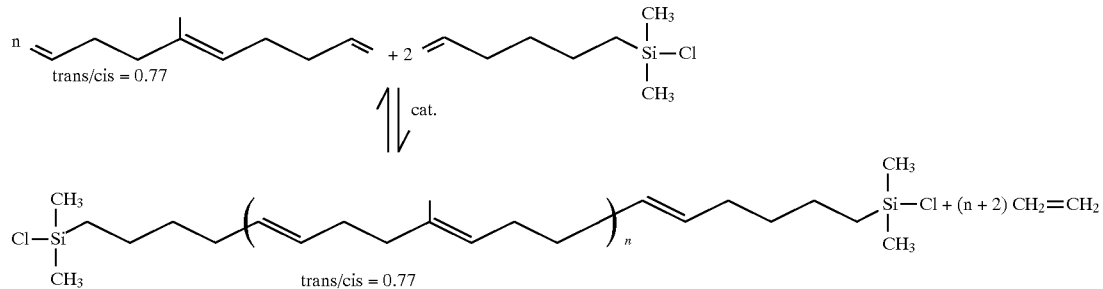

Monitoring the stereochemistry of the isoprene unit confirmed the alternating structure of the polymer. The methyl protons of the isoprene structure, both in monomer and in the polymer, produce a proton signal at 1.7 ppm for cis isomer (FIGS. 1 and 2), and at 1.6 ppm for the trans isomer. The stereochemistry of the isoprene unit in the polymer remained unchanged from the monomer with an trans/cis ratio of 0.76, which implies that this bond did not participate in the olefin metathesis reaction. Incorporation of chlorodimethylsilyl end groups into the polymer is demonstrated by the loss of its terminal vinylic protons (5.85 ppm) and the appearance of the vinylic hydrogens (1) (5.40 ppm), and dimethylsilyl protons (9) (0.43 ppm).

Quantitative $^{13}$C NMR (FIGS. 3 and 4) also confirmed that the stereochemistry of the isoprene unit had been maintained throughout the polymerization. The methine carbon of the isoprene unit produces two distinct signals for each isomer, cis at 124.9 ppm and the trans at 124.1 ppm. The trans/cis ratio determined was 0.77 for both the monomer and polymer. Retention of stereochemistry about the substituted olefin indicates that this bond had not participated in the olefin metathesis reaction. The methylene protons from the chain limiter (5) (33.5 ppm), (6) (32.3 ppm), (7) (23.0 ppm), (8) (18.0 ppm); and the dimethylsilyl protons (9) (1.6 ppm) were observed.

EXAMPLE 4

Figure 7:
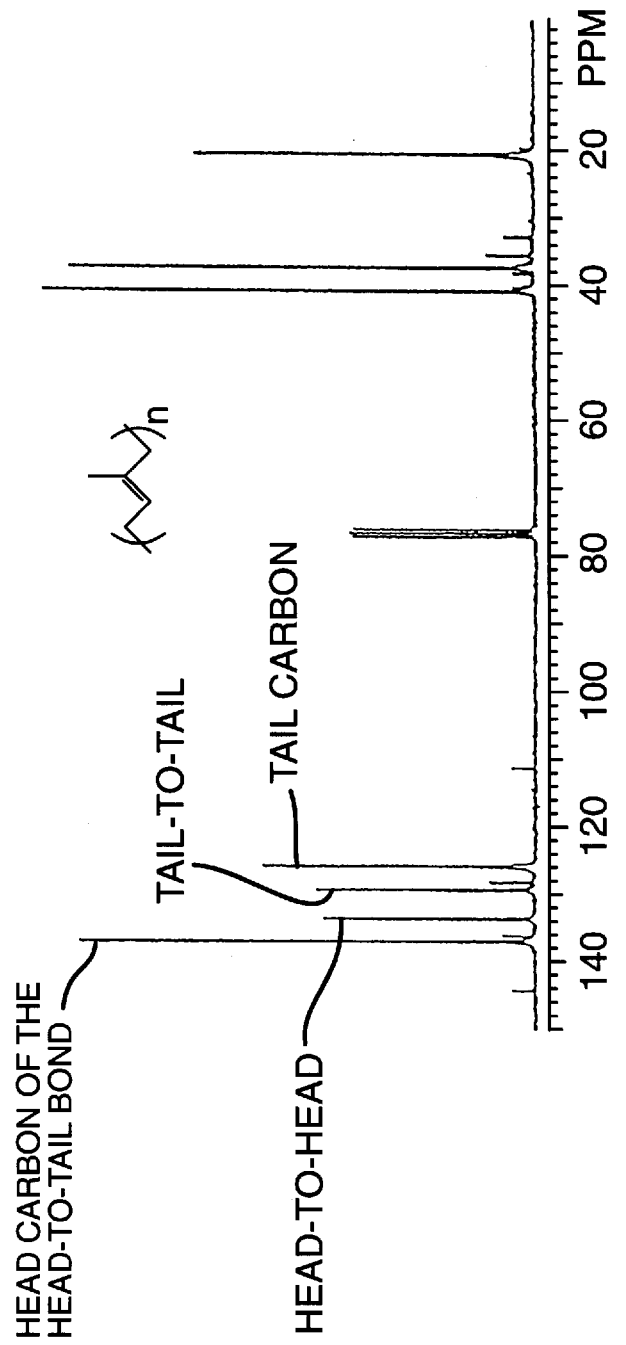
FIG. 7 is a representation of a $^{13}$C NMR (75 MHz) spectra of the telechelic oligomers produced in Example 5.

3-Methyl-1,5-hexadiene (from ICN Pharmaceuticals Inc.) was distilled from $CaH_2$, degassed by several freeze-thaw cycles, and vacuum transferred to successive sodium mirrors until no reaction was observed. Dry 3-methyl-1,5-hexadiene was then combined with 5-hexenylchlorodimethylsilane and vacuum transferred into the reaction flask (monomer to chain limiter ratio=10.6:1, and monomer to catalyst ratio= 500:1), followed by the addition of Schrock's molybdenum catalyst. After 48 h at 70°0 C., the reaction was quenched by exposure to the atmosphere. The product was dissolved in dry toluene and 0.1 g of dry alumina was added under vacuum. After a few minutes, the alumina was filtered off using a G3 sintered glass filter (also under vacuum). Toluene was distilled off, and the polymer sample was dried in vacuo at room temperature overnight. The reaction for the preparation of 5-hexenylchlorodimethylsilane terminated telechelic polyoctenamer is presented below:

(FIG. 7). Of the two possible endgroups, only the α substituted vinyl group is detected ($CH_2$ at 112.3 ppm and CH at 144.3 ppm), which indicates that the a substituted vinyl group is less reactive than the β substituted vinyl group.

The structure of poly(3-methylbutenylene) is complicated by the relative positioning of the methyl group along the polymer backbone. 3-Methyl-1,5-hexadiene possesses a "head" and a "tail" since the methyl group is α to one vinyl group and β to the other. The convention adopted refers to the a substituted vinyl end as the "head", while the β substituted vinyl end is termed the "tail". The $^{13}C$ NMR spectrum of the polymer (FIG. 7) shows the two carbon signals that correspond to the tail-to-tail linkage at 128.6 ppm (cis) and at 130 ppm (trans).

For every tail-to-tail linkage, there must be a corresponding head-to-head linkage, which appears at 134.2 ppm as one overlapping signal for both cis and trans isomers. The head-to-tail bond provides four additional carbon signals (cis and trans isomers). The carbons of the head-to-tail bond were assigned based upon their relative chemical shifts as compared to the relative shifts of the head-to-head and tail-to-tail resonances. Since the carbon signal of the head-to-head linkage is further downfield than the signal for the tail-to-tail bond, the head carbon of the head-to-tail linkage was assigned to the signal further downfield, thus the carbon signals at 137.7 ppm and 136.8 ppm were designated the head carbon of the head-to-tail bond, corresponding to the trans and cis isomers, respectively. The tail carbon of the

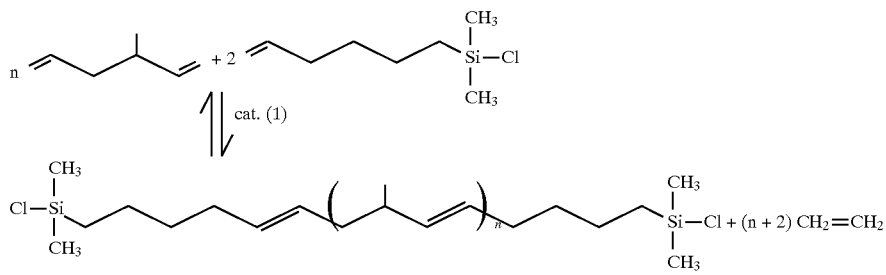

Figure 5:
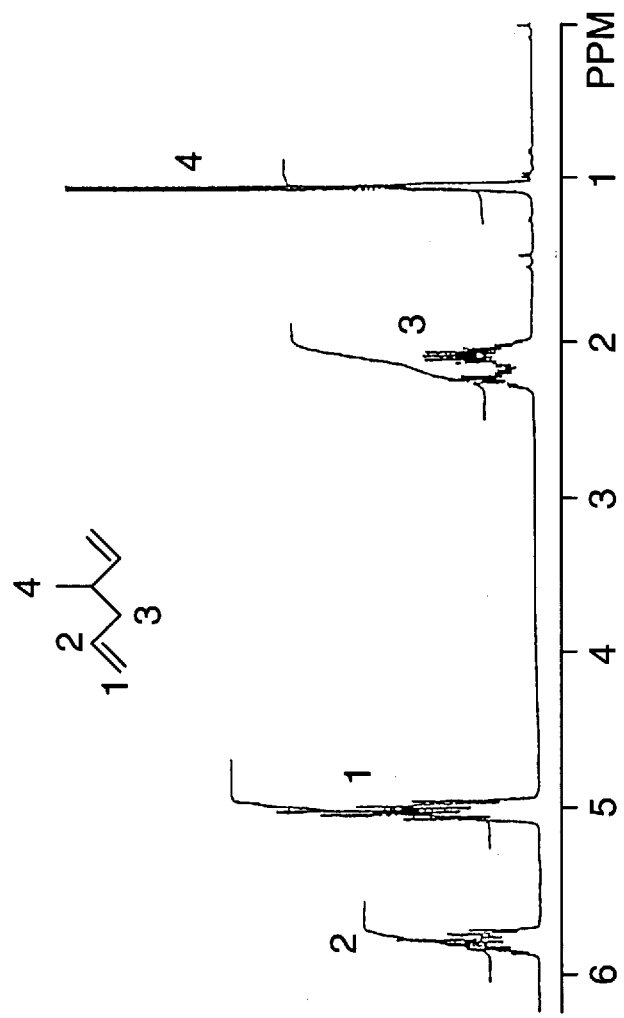
FIG. 5 is a representation of a $^1$H NMR (300 MHz) spectra of 3-methyl-1,5-hexadiene.
Figure 6:
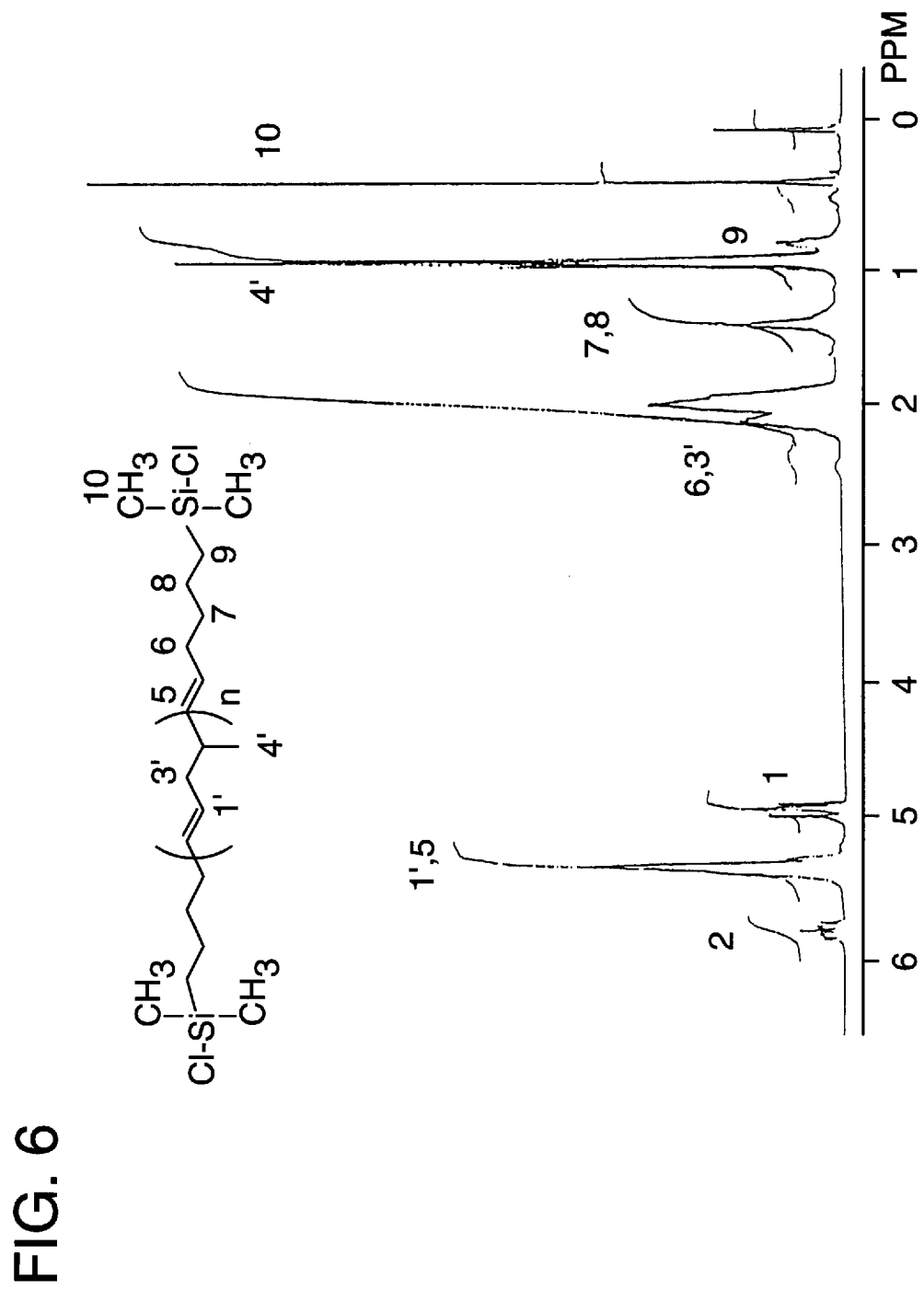
FIG. 6 is a representation of a $^1$H NMR (300 MHz) spectra of the telechelic oligomers produced in Example 5.

$^1H$ NMR spectra of the monomer, 3-Methyl-1,5-hexadiene, is shown in FIG. 5. $^1H$ NMR spectra of the telechelic oligomers are shown in FIG. 6.

The telechelic oligomers of 3-methyl-1,5-hexadiene was determined to have difunctionality of about 87% by $^1H$ NMR through integration of vinyl end groups vs. internal vinyl groups. A much higher amount of the vinyl end groups were observed in the polymerization of 3-methyl-1,5-hexadiene with 5-hexenylchlorodimethylsilane in comparison when 1,9-decadiene was used as the monomer. Characteristic manifestations of the ADMET polymerization of 3-methyl-1,5-hexadiene are the evolution of ethylene and the loss of its terminal vinylic protons at 5.9 ppm and the appearance of the vinylic hydrogens at 5.40 ppm. Results show that the measured molecular weight (from $^1H$ NMR spectrum), $(M_n)_{NMR}$=1070 is equal to the calculated value from monomer/chain limiter ratio $(M_n)_{theory}$=1020 within the limit of an experimental error. The final $M_n$ value is dictated by the initial ratio of 3-methyl-1,5-hexadiene to the chain limiter, 5-hexenylchlorodimethylsilane. $M_n$ from gel permeation chromatography (GPC) using polystyrene standards for calibration was 2300. A polydispersity of approximately 1.9 exists and is consistent for an equilibrium step propagation, condensation polymerization.

The vinyl end groups of poly(3-methyl-butylene) without chain limiter are also evident in the $^{13}C$ NMR spectrum head-to-tail bond appears at 127.5 ppm as one signal for the two overlapping resonances of the cis and trans isomers.

The tail vinyl group is the more reactive olefin and forms dimer faster than the head vinyl groups. This relative reactivity is supported by the lack of any "tail" vinyl end groups in the polymer. The transmetathesis of the tail-to-tail internal olefin with the head vinyl group is faster than the formation of the head-to-head linkage.

EXAMPLE 5

1,9-decadiene and norbornene were copolymerized with 5-hexenylchlorodimethylsilane as chain limiter using Schrock's molybdenum catalyst, $[(CF_3)_2CH_3CO]_2(N-2,6—C_6H_3—i—Pr_2)Mo=CHC(CH_3)_2Ph$. Table 3 summarizes the experimental results. Polymerizations were conducted in the bulk under vacuum. 1,9 Decadiene, norbornene and 5-hexenylchlorodimethylsilane were added to a reaction flask filled with dry argon under a stream of argon followed by additional catalyst. After 48 h at 85° C. the reaction was quenched by exposure to the atmosphere. The polymer was dissolved in toluene, and no insoluble material was detected. After purification with alumina the polymer was dried in vacuo overnight at 50° C.

TABLE 2

Molecular weight data for homopolymers and copolymers with 5-hexenylchlorodimethylsilane as chain limiter using [(CF$_3$)$_2$CH$_3$CO]$_2$ (N-2,6-C$_6$H$_3$-i-Pr$_2$)Mo = CHC(CH$_3$)$_2$ Ph as the catalyst
(M$_1$ = norbornene, M$_2$ = 1,9-decadiene)

| No | M$_1$/M$_2$ (theory) | M$_1$/M$_2$ (NMR) | yield (%) | (M$_n$)$_{Th}$ | M$_n$ (NMR) | time (h) |
|---|---|---|---|---|---|---|
| S1* | M$_2$ | — | 92 | 1900 | 1800 | 48 |
| S2 | 2.8 | 1.8 | 87 | 5700 | 3400 | 48 |
| S3 | 1.0 | 1.2 | 81 | 4800 | 15700 | 48 |

*only M$_2$ with no chain limiter.

To demonstrate the difference between the acid free catalyst of the present invention and Streck's catalyst (WCl$_6$/EtAlCl$_2$/EtOH), two experiments were conducted. First, Streck's catalyst, which is Lewis acidic, was used in an ADMET polymerization of 1,9-decadiene, using 5-hexenylchlorodimethylsilane as a chain limiter (Comparative Example 1). A second experiment (Example 6) was conducted using an acid free catalyst in the same type of reaction, also using 1,9-decadiene as the monomer and 5-hexenylchlorodimethylsilane as a chain limiter.

Comparative Example 1

Figure 9:
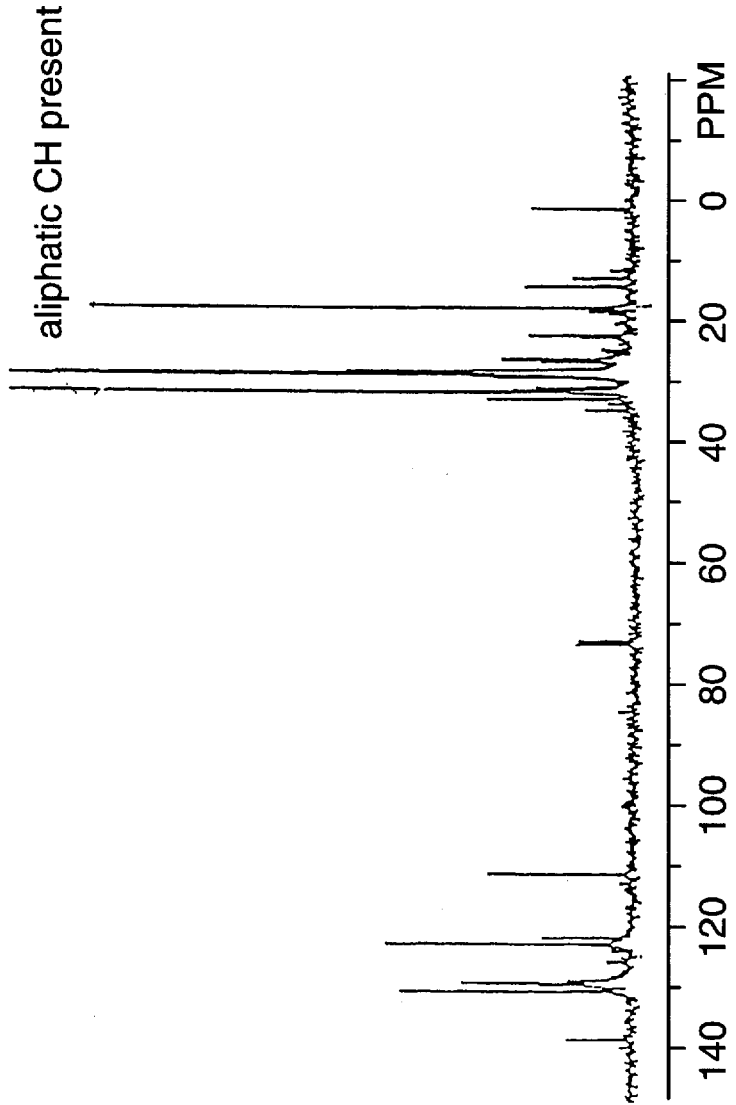
FIG. 9 is a representation of a $^{13}$C NMR (75 MHz) spectra of the product of Comparative Example 1.
Figure 11:
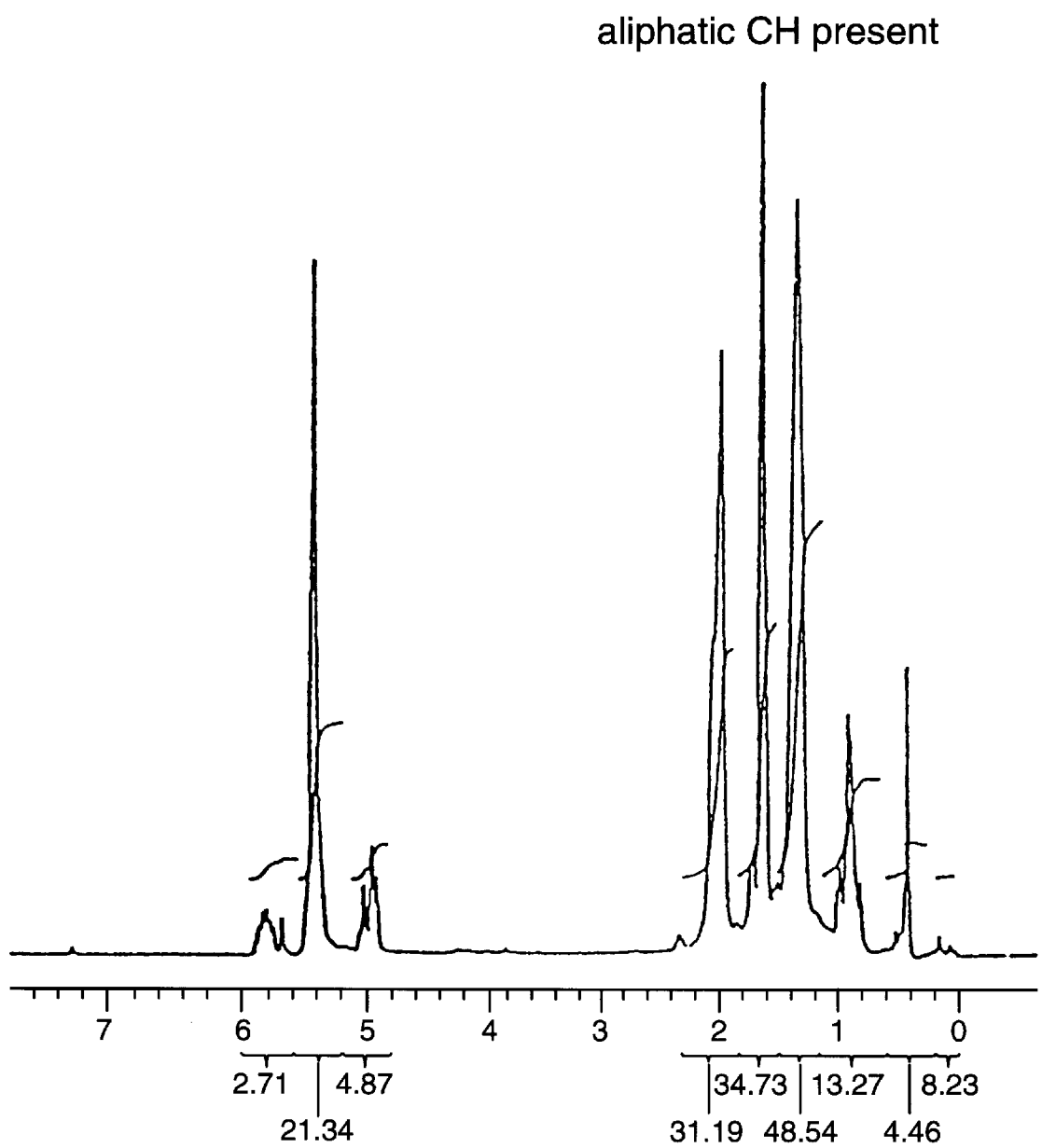
FIG. 11 is a representation of a $^1$H NMR (300 MHz) spectra of the product of Comparative Example 1.

1,9-decadiene, 5-hexenylchlorodimethylsilane and WCl$_6$ were combined and cooled to −78° C., followed by the addition of EtOH and the cocatalyst (EtAlCl$_2$). The homogenous reaction was then permitted to warm to 25° C., and after 2 hours the reaction was terminated with a few drops of methanol. Ethylene was released instantly when the cocatalyst was added to the reaction flask. A slight vacuum was applied to the reaction system to completely remove the gases formed. Both a soluble, highly viscous oil and an intractable solid were obtained from the reaction mixture. FIGS. 9 and 11 show $^{13}$C and $^1$H NMR spectra of the soluble products obtained using Streck's catalyst.

EXAMPLE 6

Figure 8:
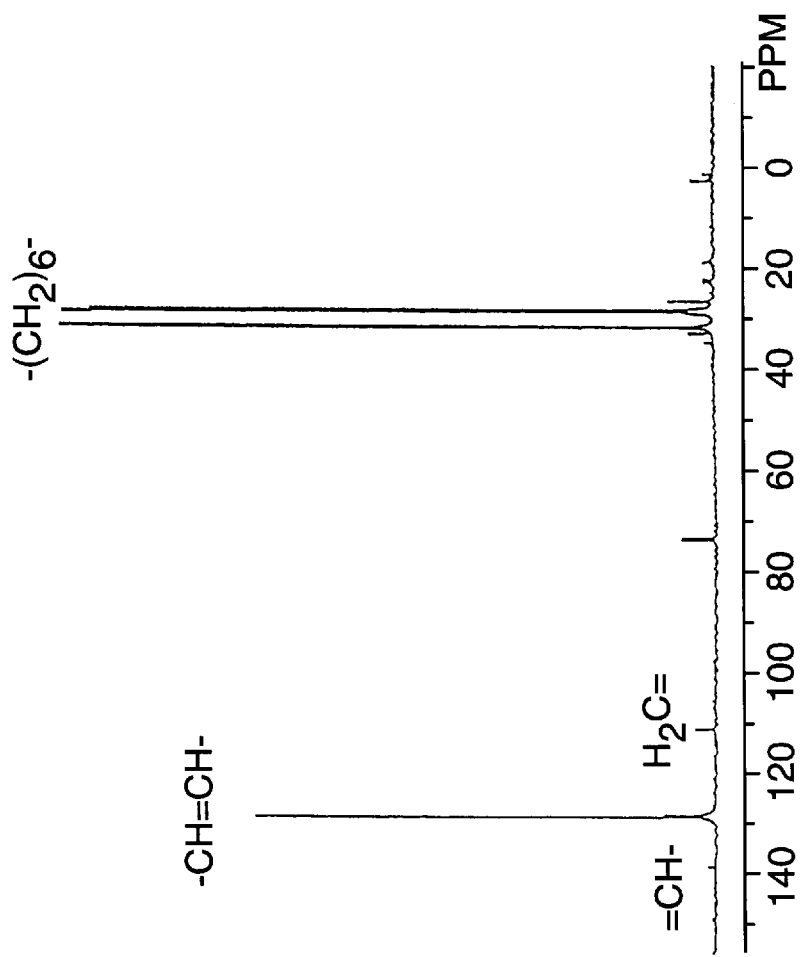
FIG. 8 is a representation of a $^{13}$C NMR (75 MHz) spectra of the product of Example 7.
Figure 10:
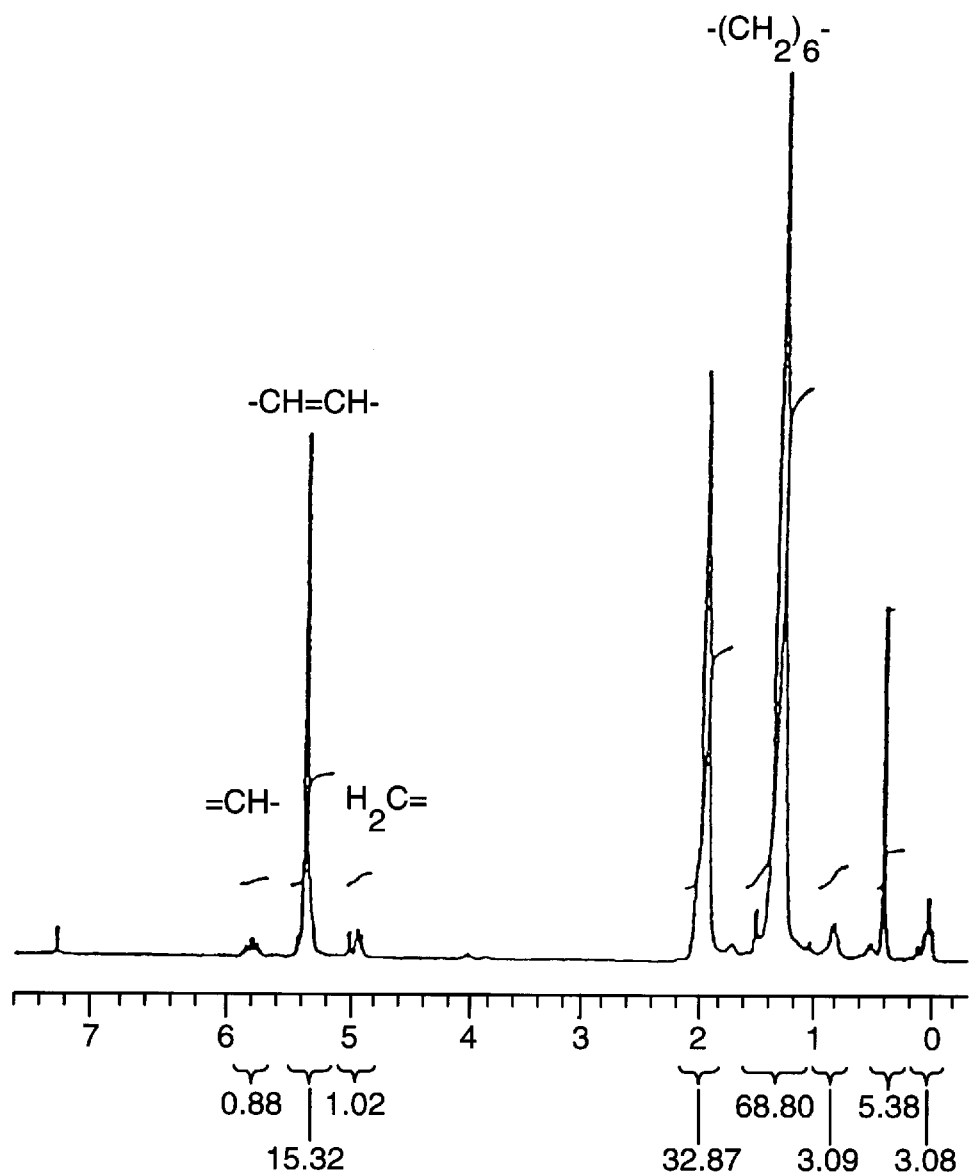
FIG. 10 is a representation of a $^1$H NMR (300 MHz) spectra of the product of Example 7.

1,9-decadiene was combined with 5-hexenylchlorodimethylsilane and vacuum transferred to a reaction flask. A catalyst, Mo(CH—CMe$_2$Ph) (N-2,6—C$_6$H$_3$—i—Pr$_2$) (OCMe(CF$_3$)$_2$)$_2$, was added to the reaction flask. Pure ethylene evolved during the polymerization, as confirmed by GC/MS. After 5 min the reaction mixture became more viscous and after 48 h at 70° C., the reaction was quenched by exposure to the atmosphere. FIGS. 8 and 10 show $^{13}$C and $^1$H NMR spectra of 5-hexenylchlorodimethylsilane terminated polyoctenamer obtained using Schrock's molybdenum catalyst system.

Regarding the product of Comparative Example 1, FIGS. 2 and 4 respectively show the loss of the monomer's terminal resonance at 114 ppm (5.9 ppm, $^1$H NMR) with the appearance of the complex multiplet at 130 ppm (FIG. 2) for the internal olefin carbons. These observations unequivocally show that when using Streck's catalyst other competing reactions are occurring. However, the $^{13}$C and $^1$H NMR spectra of the product of Example 6, which uses an acid-free catalyst, show a different mixture of oligomers. The $^{13}$C and $^1$H NMR spectra as presented in FIGS. 1 and 3 show no evidence of vinyl addition reactions which would have resulted through the formation of carbocations. Such reactions would generate aliphatic CH groups which are conspicuously absent from the products as seen by $^{13}$C NMR (FIG. 1). This result is in contrast to Comparative Example 1, which uses WCl$_6$/EtAlCl$_2$/EtOH as the catalyst system. Vinyl addition reactions occurred to a significant extent (FIGS. 2 and 4) in Comparative Example 1.

These results clearly show that a catalyst system free of Lewis acids metathesize monomers to unsaturated polymers more effectively, and are more promising in terms of preparing useful materials with well-defined structures via acyclic diene metathesis. This advantage is achieved by negating the major competing reactions.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for preparing α,ω-silyl terminated branched polyalkenylenes comprising reacting a mixture comprising:
   (A) at least one branched acyclic diene, and
   (B) at least one alkenylsilane in the presence of an acid free metathesis catalyst system to produce an α,ω-silyl terminated branched polyalkenylene.

2. The method of claim 1 further comprising hydrogenating said α,ω-silyl terminated branched polyalkenylene to produce an α,ω-silyl terminated branched polyolefin.

3. The method of claim 1 wherein said acid free metathesis catalyst system is selected from the group consisting of:
   (a) Mo(CH—CMe$_2$Ph) (N-2,6—C$_6$H$_3$—i—Pr$_2$) (OCMe(CF$_3$)$_2$)$_2$,
   (b) W(CH—CMe$_2$Ph) (N-2,6—C$_6$H$_3$—i—Pr$_2$) (OCMe(CF$_3$)$_2$)$_2$,
   (c) RuCl$_2$(=CHCH=CPh$_2$) (PCy$_3$)$_2$,
   (d) WCl$_6$/SnMe$_4$/PrOAc, and
   (e) RuCl$_2$(=CHPh) (PCY$_3$)$_2$.

4. The method of claim 1 wherein said acid free metathesis catalyst system is Mo(CH—CMe$_2$Ph) (N-2,6—C$_6$H$_3$—i—Pr$_2$) (OCMe(CF$_3$)$_2$)$_2$.

5. The method of claim 1 wherein said branched acyclic diene is a non-conjugated α,ω-diene.

6. The method of claim 1 wherein said branched acyclic diene is selected from the group consisting of 3-methyl-1,5-hexadiene and 5-methyl-1,9-decadiene.

7. The method of claim 1 wherein said alkenylsilane is selected from the group consisting of hexenylchlorosilanes hexenylalkoxysilanes, and their self-metathesis dimers.

8. The method of claim 1 wherein said alkenylsilane is selected from the group consisting of 5-hexenylchlorodimethylsilane, 5-hexenylmethoxydimethylsilane, and their self-metathesis dimers.

9. A method for preparing an α,ω-silyl terminated branched polyalkenylene comprising reacting a mixture comprising:
   (A) at least one cycloolefin, and
   (B) at least one alkenylsilane in the presence of an acid free metathesis catalyst system to produce an α,ω-silyl terminated branched polyalkenylene.

10. The method of claim 9 further comprising hydrogenating said α,ω-silyl terminated branched polyalkenylene to produce an α,ω-silyl terminated branched polyolefin.

11. The method of claim 9 wherein said acid free metathesis catalyst system is selected from the group consisting of:
   (a) Mo(CH—CMe$_2$Ph)(N-2,6—C$_6$H$_3$—i—Pr$_2$) (OCMe(CF$_3$)$_2$)$_2$, (b) W(CH—CMe₂Ph) (N–2,6—C₆H₃—i—Pr₂) (OCMe(CF₃)₂)₂, (c) RuCl₂(=CHCH=CPh₂) (PCY₃)₂, (d) WCl₆/SnMe₄/PrOAc, and (e) RuCl₂(=CHPh) (PCY₃)₂.

12. The method of claim 9 wherein said acid free metathesis catalyst system is Mo(CH—CMe₂Ph) (N–2,6—C₆H₃—i—Pr₂) (OCMe(CF₃)₂)₂.

13. The method of claim 9 wherein said cycloolefin is selected from the group consisting of norbornene, alkyl substituted cyclopentene, alkyl substituted cyclooctene and alkyl substituted 1,4-cyclooctadiene.

14. The method of claim 13 wherein an acyclic diene is included in the reaction mixture.

15. The method of claim 9 wherein said alkenylsilane is selected from the group consisting of hexenylchlorosilanes hexenylalkoxysilanes, and their dimers.

16. The method of claim 15 wherein said alkenylsilane is selected from the group consisting of 5-hexenylchlorodimethylsilane, 5-hexenylmethoxydimethylsilane, and their dimers.

17. An α,ω-silyl terminated branched polyalkenylene having the general formula:

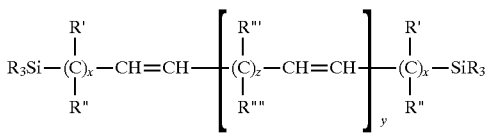

where R, R', R", R''' and R"" are independently selected from the group (C₁–C₆), H, aryl, organo functional cycloalkane; x is 1–10, y is 10–10,000 and z=3–20.

18. An α,ω-silyl terminated branched polyolefin having the general formula:

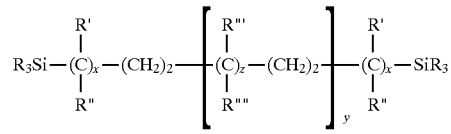

where R, R', R", R''' and R"" are independently selected from the group (C₁–C₆), H, aryl organofunctional alkyl group, chloro, bromo, alkoxy and cycloalkane; x is 1–10, y is 10–10,000 and z=3–20.

* * * * *